July 16, 1935.  G. S. TIPSON  2,008,372
BAGGAGE RACK
Filed June 11, 1934
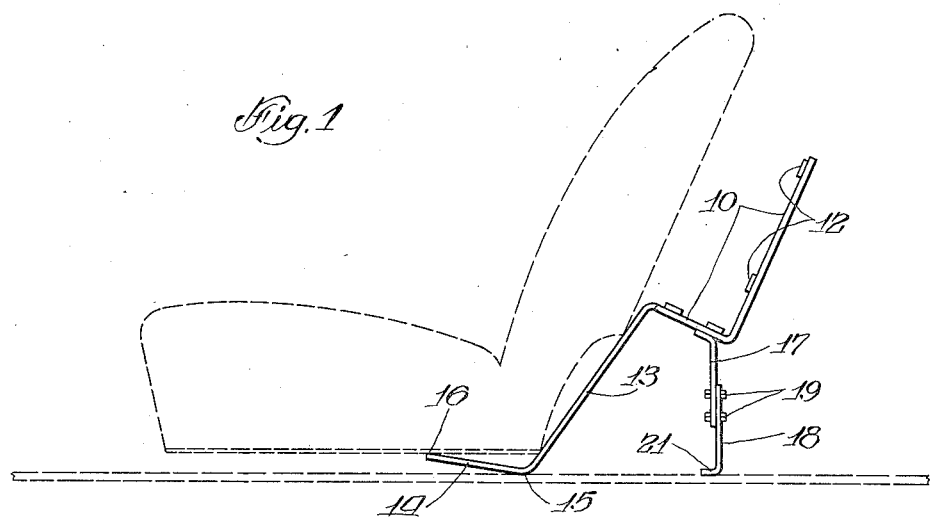
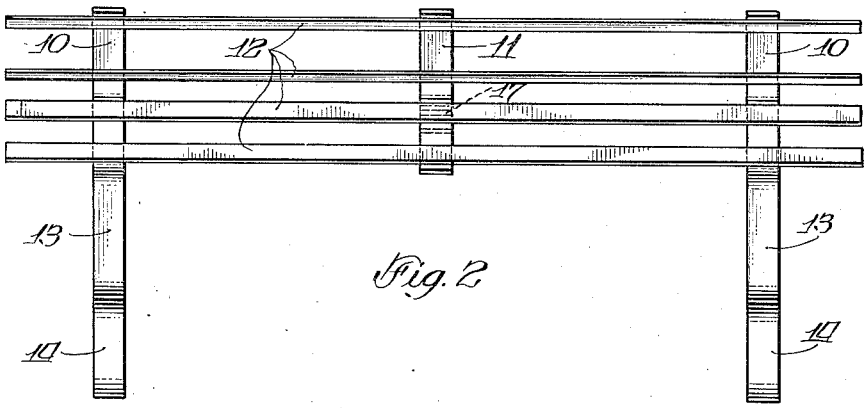
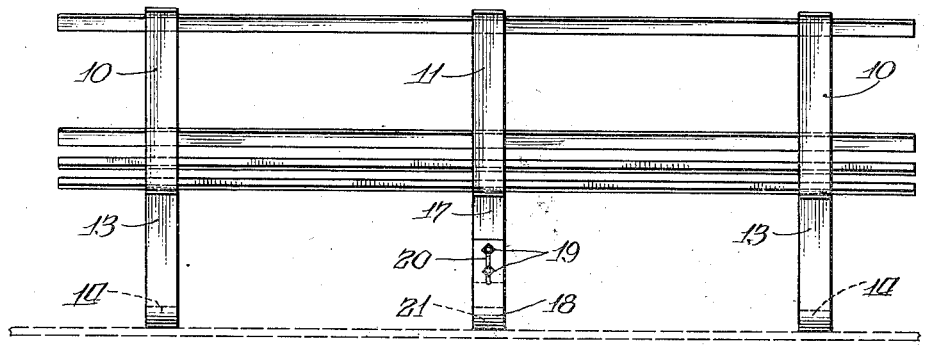
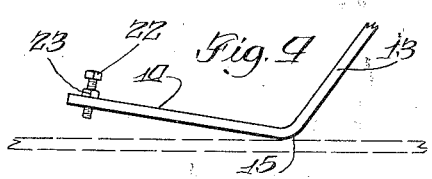
Inventor:
George S. Tipson.
By: Brayton Richards
Attorney.

Patented July 16, 1935

2,008,372

UNITED STATES PATENT OFFICE 2,008,372

BAGGAGE RACK

George S. Tipson, Chicago, Ill.

Application June 11, 1934, Serial No. 729,961

6 Claims. (Cl. 224—29)

The invention relates to improvements in baggage racks especially adapted for use in conjunction with automobiles and has for its primary object the provision of an improved construction of the character indicated which is capable of ready insertion in or removal from an automobile, which will not materially detract from the available leg or foot space therein, which is capable of economical production and which is highly efficient in use.

Another object of the invention is the provision of a baggage rack of the character indicated so arranged as to adapt it for carrying comparatively heavy baggage or articles.

Other objects will appear hereinafter.

The invention consists in the combinations and arrangements of parts hereinafter described and claimed.

The invention will be best understood by reference to the accompanying drawing forming a part of this specification and in which Fig. 1 is a side view showing a baggage rack embodying the invention in actual position of use;

Fig. 2, a top plan view of the same;

Fig. 3, a rear elevation of the same; and

Fig. 4, an enlarged fragmentary view of a modified form of toe piece which may be employed in the rack.

The embodiment of the invention illustrated in the drawing comprises three frame bars 10 and 11 bent into substantially L-shape and connected by transverse bars or slats 12 spot-welded or otherwise secured thereto to form a substantially L-shaped baggage carrier, as indicated.

The two end bars 10 are provided with forwardly and downwardly extending portions 13 terminating at their lower ends in forwardly extending toe pieces or projections 14 forming curved knee supports 15 adapted to rest on the floor of the automobile with the points 16 of the toe pieces 14 tilted upwardly into securing engagement with the bottom of the automobile seat, as indicated in Fig. 1.

By this arrangement, a baggage rack is provided which may be readily inserted in or removed from an automobile and in which none of the parts are permanently attached in any way to the automobile. The weight of baggage in the baggage carrier tends to tilt the ends of the toe members 14 upwardly into securing engagement with the bottom of the seat thereby securing the rack in place without the necessity of any other form of attachment. As will be noted, the baggage in the baggage carrier will be carried well above the feet of persons occupying the rear seat of the automobile and therefore will interfere in no way with the ordinary leg or foot room provided therein.

In order to facilitate the carrying of relatively heavy articles of baggage, a supporting leg is secured to the central portion of the bottom of the baggage carrier. This leg is preferably made in upper and lower parts 17 and 18, the upper part 17 being spot-welded to the underside of the central bar 11 and the lower part 18 being adjustably secured thereto by means of bolts 19 engaging the slot 20, as indicated.

At its lower end the leg portion 18 is provided with an angularly turned foot 21 to rest upon the floor of the automobile. By properly adjusting the length of the supporting legs 17—18, sufficient tension will be placed upon the toes 14 by the weight of the baggage, whereupon the supporting leg will rest upon the floor of the automobile, thereby preventing further straining of the parts.

In the modification illustrated in Fig. 4, the toe pieces 14 are provided with set screws 22 threaded through the ends thereof and equipped with lock nuts 23 as shown. By this arrangement the toe pieces may be readily adjusted to fit under front seats of various heights from the floor of the automobile.

While I have illustrated and described the preferred form of construction for carrying the invention into effect, this is capable of variation and modification without departing from the spirit of the invention. I therefore do not wish to be limited to the precise details disclosed, but would desire to avail myself of such variations and modifications as fall within the scope of the appended claims.

I claim:

1. A baggage rack comprising a baggage carrier; and supporting means on said carrier arranged to rest loosely on the floor and engage loosely under the front seat of an automobile and support said carrier in elevated position.

2. A baggage rack comprising a baggage carrier; and a supporting element extending downwardly and forwardly therefrom, arranged to rest loosely on an automobile floor and provided with a forward projection arranged to extend under the front seat of an automobile and whereby the forward end of said projection is caused to be tilted up by the weight of the baggage to engage the bottom of said seat, thereby securing said carrier in place.

3. A baggage rack comprising a baggage carrier; a supporting element extending downwardly and forwardly therefrom, arranged to rest loosely on an automobile floor and provided with a forward projection arranged to extend under the front seat of an automobile and whereby the forward end of said projection is caused to be tilted up by the weight of the baggage to engage the bottom of said seat, thereby securing said carrier in place; and another supporting element extending directly downwardly from said carrier and arranged to rest loosely on the automobile floor.

4. A baggage rack made up of supporting bars having their upper portions bent into substantially L-form, their lower portions extending forwardly and downwardly therefrom and formed at their lower ends into forward extensions adapted and arranged to be inserted under the bottom of the front seat of an automobile; and transverse bars secured to the upper portion of said supporting bars to form a baggage carrier.

5. A baggage rack made up of supporting bars having their upper portions bent into substantially L-form, their lower portions extending forwardly and downwardly therefrom and formed at their lower ends into forward extensions adapted and arranged to be inserted under the bottom of the front seat of an automobile; transverse bars secured to the upper portion of said supporting bars to form a baggage carrier; and an adjustable supporting leg secured to said carrier and projecting downwardly therefrom to rest loosely on the floor of the automobile.

6. A baggage rack comprising a baggage carrier; a supporting element extending downwardly and forwardly therefrom, arranged to rest on an automobile floor and provided with a forward projection arranged to extend under the front seat of an automobile; and a set screw threaded in the forward end of said projection and arranged to contact with the underside of said front seat.

GEORGE S. TIPSON.